United States Patent [19]

Bafford et al.

[11] Patent Number: 4,746,565
[45] Date of Patent: May 24, 1988

[54] FIRE BARRIER FABRICS

[75] Inventors: Richard A. Bafford, Aiken, S.C.; Hans R. Hoernle, Augusta, Ga.

[73] Assignee: United Merchants and Manufacturers, Inc., New York, N.Y.

[21] Appl. No.: 912,264

[22] Filed: Sep. 26, 1986

[51] Int. Cl.⁴ .............................................. B32B 3/00
[52] U.S. Cl. ...................................... 428/251; 5/448; 5/459; 5/483; 156/93; 156/244.11; 156/308.4; 156/308.6; 297/DIG. 5; 427/407.3; 428/102; 428/268; 428/273; 428/285; 428/296; 428/423.1; 428/920; 428/257
[58] Field of Search ............... 428/251, 268, 269, 273, 428/285, 413.1, 920, 296, 102, 257; 156/93, 244.11, 308.4, 308.6; 5/448, 459, 483; 427/407.3; 297/DIG. 5

[56] References Cited

U.S. PATENT DOCUMENTS

| | | | |
|---|---|---|---|
| 2,215,061 | 9/1940 | Alt | 428/251 |
| 2,686,737 | 8/1954 | Caroselli | 428/251 |
| 2,823,156 | 2/1958 | Hedges | 428/253 |
| 2,830,925 | 4/1958 | Fennebresque | 428/290 |
| 2,956,917 | 10/1960 | Fasano | 428/255 |
| 3,490,985 | 1/1970 | Marzoichi et al. | 428/196 |
| 3,616,185 | 10/1971 | Goldberg | 428/251 |
| 3,623,937 | 11/1971 | Gasaway | 428/251 |
| 3,717,528 | 2/1973 | Peerman et al. | 428/251 |
| 3,779,854 | 12/1973 | Dukert et al. | 428/251 |
| 3,992,842 | 11/1976 | Haage et al. | 428/251 |
| 4,210,070 | 7/1980 | Tatum et al. | 428/251 |
| 4,282,283 | 8/1981 | George et al. | 428/251 |
| 4,504,991 | 3/1985 | Klancnik | 428/251 |
| 4,507,347 | 3/1985 | Lupton | 428/251 |
| 4,526,830 | 7/1985 | Ferziger et al. | 428/268 |
| 4,619,854 | 10/1986 | Penttinen | 428/251 |

Primary Examiner—James J. Bell
Attorney, Agent, or Firm—Rodman and Rodman

[57] ABSTRACT

A flame resistant fire barrier fabric comprising a preformed self-extinguishing thermoplastic face fabric laminated to an underlying glass fabric wherein the glass fibers are coated with a thin adherent encapsulating coating, and wherein the encapsulating coating substantially minimizes fiber to fiber self abrasion.

20 Claims, No Drawings

FIRE BARRIER FABRICS

BACKGROUND OF THE INVENTION

1. Field of the Invention

The present invention relates to an improved fire barrier fabric and its method of preparation.

2. Description of the Prior Art

In the United States in 1983, over 37,000 people were seriously injured in residential and institutional fires. Property damage due to the same fires amounted to six billion dollars. Another source of serious and fatal burn injuries are accidents involving vehicles. In addition, many serious burn injuries occur in vehicles which are caused by careless smoking or children playing with matches. Since many vehicular fires are enclosed within the metal shell of the car body, they reach very high temperatures in a short period of time.

Extensive research has been conducted by both government and industry to develop materials for home furnishings that are either non-flammable or retard flame propagation. Other important considerations are that the materials be functional, aesthetic and economical.

Standards such as DOT 302 have been promulgated for materials used in vehicles. DOT Standard 302 limits the rate of flame propagation for fabrics used in vehicles. However, it has been repeatedly demonstrated that the burning characteristics of a multi-component structure can not be predicted from the burning characteristics of the individual components.

The federal government has developed the "cigarette burn test" to rate upholstery fabrics. However, certain fabrics that will not ignite from a smoldering cigarette (class 1 fabrics), can burn in contact with an open flame and allow the underlying batting in a cushion or upholstered furnishing to ignite.

Fire retardant foam coatings for drapery liners and backcoatings for upholstery fabrics are commercially available. There are chemical treatments for apparel fabrics. However, at best, these materials are self-extinguishing when the flame source is removed. If the flame source is not removed, these materials will char, lose their integrity and allow the flame to reach materials under the fabric coating.

Plasticized polyvinyl chloride (vinyl) and polyurethanes are extensively used for upholstery fabrics especially in transportation vehicles, kitchen furniture, furnishings in restaurants, theaters, night clubs and public buildings. These fabrics are inexpensive, long wearing, easy to clean and can be produced in a wide variety of textures, colors and weights.

Such fabrics usually consist of a cotton, polyester or polyester/cotton scrim to which is bonded a layer of vinyl or urethane. The scrim fabric can be woven, knit or non-woven and is usually a lightweight open fabric designed to provide dimensional stability, tensile strength and tear resistance to the composite fabric. The vinyl (where term "vinyl" is used, polyurethane would be equally applicable) can be extrusion coated onto the scrim or can be cast as a separate film and subsequently bonded to the scrim by stitch bonding, adhesive bonding, or heat bonding.

A typical vinyl upholstered chair consists of a metal, wood or plastic frame. The seat consists of a plywood base, a two to three inch thick slab of polyurethane foam and vinyl fabric enclosing the foam and stapled to the bottom of the wood base. Seats in vehicles such as school buses and subway cars are of similar construction. In automobiles, metal springs replace the plywood.

By proper selection of plasticizer and fire retardant fillers such as antimony oxide, self-extinguishing vinyl fabric can be produced. However, in the presence of a flame, the vinyl can shrink and expose the underlying material, usually urethane foam or polyester fiberfill. When these materials ignite, the entire chair or seat will be quickly engulfed in flames.

U.S. Pat. No. 4,526,830 to Fergizer relates to coated glass fiber fabrics suitable for use as mattress tickings. The fabrics comprise a woven or non-woven glass fiber fabric to which a layer of polymeric coating composition has been applied. The polymeric carrier can also include a fungicide, bactericide, flame retardant and filler.

U.S. Pat. No. 2,956,917 to Fasano discloses the impregnation of a loosely woven glass fabric in a solution of a polyalkyl methacrylate and a vinyl resin polymer comprising predominantly vinyl chloride, to set or adhere the glass yarns to each other and prevent distortion of the weave pattern, and laminating a preformed vinyl resin film onto the treated fabric by means of pressure.

U.S. Pat. No. 2,215,061 to Alt discloses a fabric prepared by coating a woven glass fabric with a coating composition derived either from cellulose, a synthetic resin, a natural resin, or a protein.

U.S. Pat. No. 2,686,737 to Caroselli et al discloses coated glass fiber fabrics wherein the coating is a butadiene-acrylonitrile copolymer.

U.S. Pat. No. 3,490,985 to Marzocchi et al discloses decorated woven glass fabric produced by taking two different types of interwoven strands and applying a mixture of thermoplastic resin, foaming agent and plasticizer over areas of the fabric which include the two different types of strands. The foaming agent reacts to foam the mixture in situ about the adjacent portion of both types of strands to provide flexible raised areas of foamed resin. The foamed resin is poorly bonded to one type of strand but strongly coupled to the other.

U.S. Pat. No. 2,830,925 to Fennebresque discloses a plastic laminate for decorative purposes produced by incorporating into the laminate a pigmented fibrous material which can be made of glass fiber.

SUMMARY OF THE INVENTION

The present invention relates to a coated glass fiber fabric which is laminated to the back of a self-extinguishing thermoplastic face fabric to provide a flame resistant barrier when exposed to fire, and prevents the underlying material from igniting.

DESCRIPTION OF THE PREFERRED EMBODIMENT

In accordance with the present invention, a flame resistant fire barrier fabric is composed of a prefinished self-extinguishing thermoplastic face fabric. The thermoplastic face fabric, generally a plasticized polyvinyl chloride or polyurethane is laminated to an underlying glass fiber fabric. The glass fiber fabric is inherently non-flammable and maintains its integrity when exposed to high heat and flames to act as a barrier in preventing underlying materials covered by the glass fiber fabric laminate from igniting.

Glass fibers are self-abrasive. Thus, glass fibers rubbing against each other will self-destruct. Since the glass fabric/vinyl laminate will flex in normal use, it is necessary to coat the glass fiber fabric with a suitable protective material which will coat and encapsulate the fibers and minimize the tendency of the glass fibers to self-destruct.

The glass fiber fabric protective coatings should not reduce the non-flammable characteristics of the glass fiber nor should the pyrolysis products of the coating be a source of heavy smoke upon ignition. The coatings generally consist of a polymeric binder and suitable fillers. The synergistic action of antimony oxide and halogen containing compounds is well-known. Thus, a typical coating may consist of a halogenated polymer such as polyvinyl chloride, polyvinylidine chloride or polyvinylfluoride or copolymers containing vinyl fluoride and finely dispersed antimony oxide. Halogenated plasticizers are used to alter the hand of the coating as well as to provide halogen. Phosphorus derivatives are also often incorporated to contribute smolder resistance. Aluminum trihydrate can also be used as an additive. At elevated temperatures, the endothermic decomposition of aluminum trihydrate contributes water vapor to smother flames. Other systems can use highly brominated organic compounds such as decabromodiphenyl oxide with antimony oxide.

The novel fire barrier fabrics of the present invention comprise a woven or non-woven glass fiber material which has been given a protective coating to encapsulate the glass fibers, and a vinyl face fabric.

In the construction of a vehicle seat, such as a school bus seat the cushioning material, usually polyurethane foam, can be first covered with the coated glass fiber fabric and then covered with the vinyl face fabric. A preferred approach is to prelaminate the glass fabric to the vinyl face fabric. The glass fabric can be adhesively bonded, stitch bonded or heat bonded to the vinyl face fabric.

It has been discovered from the results of simulated school bus fires, that the prelaminated fabric is a superior fire barrier than the corresponding sequentially applied fabrics. A sequentially applied fabric is one wherein there is no bonding between the respective fabrics. Thus, a sequentially applied fabric for a bus seat would include a polyurethane foam base, glass fiber fabric wrapped around the foam, followed by a layer of vinyl face fabric wrapped around the glass fiber fabric.

While it is not certain what the actual basis is for the superior performance of the prelaminated fabric over the sequentially applied fabric in functioning as a fire barrier, it is believed that when the prelaminated fabric is exposed to flames, the vinyl does not shrink away from the underlying glass fiber fabric to which it is laminated, but softens and flows into the interstices of the glass fiber fabric to prevent passage of oxygen to the underlying cushioning materials and also to prevent outward passage of flammable gases generated by anaerobic pyrolysis of the cushioning materials.

Despite the superior performance of the prelaminated fabric, the sequentially applied glass fiber fabric and vinyl face fabric on a vehicle seat represent a significant advance over the state of the art for fire resistant vehicle seats.

In general, the vinyl face fabric is impermeable. However, it is not necessary that the vinyl face fabric be impermeable to the passage of air in order for the glass fiber fabric/vinyl face fabric composite to function as a fire barrier. In general, the porosity of the composite should not exceed a critical porosity value of about 300 cubic feet per square foot per minute when measured at a pressure of one-half inch of water. The critical porosity value is not an absolute value, but depends to some degree on the flammability of the underlying cushioning material. It generally ranges from about a value of 200 to 300.

Suitable woven glass fiber fabrics include plain weave, basket weave, leno weave, twill weave, crowfoot satin or long shaft satin. Suitable knit fabrics include warp knits and weft knits. Non-woven glass mats are also suitable. The construction of the fabric should be such that the composite whether or not prelaminated should not exceed the critical porosity value.

Suitable plain weave fabrics include those having warp counts (the number of yarns per inch) of from about 40 to 120 and filling counts of from 30 to 60. Fabric weights from about 2.0 to 8 oz/yd$^2$ are suitable.

Suitable coating compositions consist of a polymeric binder, fillers, fire retardant additives, and optional pigments and/or plasticizers. The continuous medium can be water or an organic solvent. Water is preferred because of environmental considerations.

Typical binders include emulsion polymers such as vinyl chloride polymers, ethylene/vinyl chloride copolymers, vinylidine chloride/alkyl methacrylate copolymers, vinyl chloride/vinyl acetate copolymers, Neoprene polymers, polyurethanes, vinyl acetate/alkyl acrylate copolymers or combinations thereof. It is preferable that at least a portion of the binder consist of a polymer containing chlorine or fluorine. Typical fillers include clay, calcium carbonate, talc or titanium dioxide. Fire retardant additives include antimony trioxide, antimony pentoxide, aluminum trihydrate, and decabromodiphenyl oxide.

An effective fire retardant is a mixture of antimony trioxide and a organohalogen compound. The source of halogen can be from the polymeric binder, for example, polyvinyl chloride or copolymers containing vinyl chloride. Where the binder contains no halogen, suitable halogen donors such as decabromodiphenyl oxide can be added to the composition.

Depending on the selection of the polymeric binder, it may be necessary to incorporate plasticizers into the composition to avoid stiffening the fabric. While a wide variety of organic plasticizers are suitable for softening the coating it is preferable to use phosphate ester plasticizers which can contribute flame retardancy to the coating. Most preferable are phosphate esters containing halogen such as tris(p-chlorophenyl) phosphate, tris(2,3,dichloropropyl) phosphate) and the like.

When the coated glass fiber fabric is adhesively bonded or heat bonded to the vinyl face fabric, it is important that none of the components of the coating composition reduce or detract from the strength of the bond.

The coating can be applied to the glass fiber fabric as a liquid coating or a collapsible foam. Suitable methods for applying a liquid coating include gravure coating, reverse roll coating, knife over roll, knife over table, floating knife or pad/nip coating. The method of coating is not critical to the invention provided complete encapsulation of the glass fibers is accomplished.

Where the coating is applied as a collapsible foam, it is necessary to incorporate a foaming agent into the coating composition, again with the provision that the foaming agent not interfere with the efficacy of the bonding of the encapsulated glass fiber fabric to the face fabric. Suitable methods for applying collapsible foams include horizontal pad, floating knife, knife over roll followed by crush rolls, or gravure coating.

The quantity of coating applied to the glass fiber fabric can range from about 5% to about 100% preferably from 8 to 30% based on the weight of the fabric. However, it is critical that sufficient coating be applied to completely encapsulate the glass yarns. Too much coating can be detrimental since it can stiffen the hand of the composite fabric.

An optional primer coating or treatment can be given to the glass fiber fabric to improve adhesion of the encapsulating coating. Suitable primers include coupling agents such as organosilanes or organotitanates. These are often blended with emulsion acrylic polymers and applied from dilute aqueous dispersions to the fabric.

It has been found that when a preformed vinyl face fabric is laminated or coated onto the glass fiber fabric, better overall properties occur than if the vinyl were coated onto the glass fiber fabric in an uncured or liquid state, and then cured. Thus, the vinyl fabric should be preformed, and is considered to be preformed when laminated to the glass fiber fabric by means of extrusion casting of the vinyl onto the glass fiber fabric.

The fire barrier fabric of the present invention meets or exceeds the Original Equipment Manufacturers (OEM) Standards for the Bus Industry. Table I, which follows, tabulates certain test results in comparison with the corresponding OEM standard.

TABLE I

| | Invention | OEM Standard |
|---|---|---|
| 1. Total Weight | 33 oz/54 inches | 34 oz/54 inches |
| 2. Grab Tensile (ASTM D 751) | 150 × 145 | 135 × 120 |
| 3. Tongue Tear (Fed Std 191A-5134) | 10 × 12 | 9 × 13 |
| 4. Adhesion, lb/inch (ASTM D 751) | could not separate | 5.5 × 5 lbs |
| 5. Flex Test (CFFA-10) | Pass | Pass |
| 6. Seam Breakage (AMC Method) | 101 × 99 | 120 × 90 |

Testing

The efficacy of the fire barrier fabrics has been established by constructing full size vehicle seats which were tested under fire conditions. While such testing is expensive, it is well-known that simple small scale tests such as DOT 302, of the composite fabric can only distinguish differences in flammability of the fabrics and can not predict the burning characteristics of a multicomponent structure in a real fire.

The test chamber was a standard fire test room, 8 feet by 12 feet by 8 feet high with an open 30 by 80 inch door centered in one 8 foot wall. Three school bus seats were arranged end on to the the room back wall. Spacing was 27.5 inches (bolt to bolt), which is conventional for school buses. Bus seat construction was similar to that presently used in the industry.

All materials used for the test control bus seats meet present federal and state standards for school bus construction. The seats were made of a metal frame with slab urethane foam cushioning and a vinyl face fabric.

The following examples serve to illustrate the present invention. All parts and percentages are by weight, unless otherwise indicated.

EXAMPLE 1—Test Fabrics

A heat cleaned plain weave glass fabric fiber having a count of 60 warp ends per inch and 48 fill ends per inch, a weight of 3.16 oz per square yard was given a primer finish by immersing the fabric in an aqueous bath consisting of 0.3% of gamma glycidoxypropyltrimethoxy-silane, 4.0% of a 46% solids polyacrylic ester copolymer emulsion, 1.0% of a 25% solids polytetrafluoroethylene emulsion, 2.0% of antimigrant and 0.1% of aqua ammonia (26° Be). The fabric was squeezed through pad rolls and dried. The dry add-on of finish was about 1.25% based on weight of the fabric.

An encapsulating coating was prepared by blending the following components:

42%—water
3.6%—antimony trioxide
6.8%—chlorinated paraffin wax
6.8%—aluminum trihydrate
26.0%—ethyl acrylate/acrylonitrile copolymer latex
5.3%—ethylene/vinyl chloride copolymer latex
1.0%—triaryl phosphate placticizer
2.3%—ethyl acrylate/acrylic acid copolymer latex
0.5%—ethoxylated octylphenol
0.5%—aqua ammonia
5.2%—33% solution of ammonium stearate The coating was mechanically foamed to a blow ratio of 4 to 1 and applied to the glass fiber fabric using a horizontal pad. The fabric was dried and cured. The dry add-on of coating was 12% by weight of the fabric.

BURNING TESTS

EXAMPLE 2—Standard School Bus Seats

The seat covering was self-extinguishing vinyl fabric weighing 22 oz. per square yard. The ignition source was the Boston bag test. A kraft grocery bag containing four sheets of loosely crumpled newspaper (weight 155 grams) was placed in the center of the middle seat with the wide side of the bag against the back cushion. The base of the paper bag was ignited with a match and a timer started. Within one minute, there was an accelerating rate of combustion with evolution of large quantities of black smoke. At 1.5 minutes, smoke completely obscured the upper three feet of the test chamber. At 2.5 minutes, the fire flashed over to the back of the front seat and smoke obscured the upper five feet of the chamber. At 3.0 minutes, the rear seat ignited and the chamber flashed over. The fire was then extinguished with water. The maximum ceiling temperature was 1850° F.

EXAMPLE 3—Bus Seats Covered Sequentially with Glass Fiber Fabric and the Vinyl Face Fabric The seat covering consisted of a layer of the glass fiber fabric of Example 1 and a layer of the 22 oz. per square yard vinyl described in Example 2. The ignition source was the Boston bag test with the bag placed on the middle seat. Flames from the burning paper bag diminished after five minutes. After six minutes there was only a tiny flame at the intersection of the seat and back cushions. This flame self extinguished after nine minutes. Maximum ceiling temperature was 279° F. About 80% of the face fabric on the back cushion and 60% of the face fabric on the seat cushion was charred but the glass fabric remained intact. Some of the urethane foam in the back cushion melted behind the glass fabric but there was no molten drip beneath the seat nor was there any evidence of any burning behind the barrier. Neither the front nor the rear seats were damaged. Other than the smoke from the burning newspaper, there was very little smoke generation and the smoke generated was white.

EXAMPLE 4—Bus Seats Covered with a Coated Glass Fiber Fabric Laminated to Vinyl The glass fiber fabric of Example 1 was laminated to a vinyl fabric by extrusion casting the vinyl onto the glass fiber fabric. The vinyl used was identical in composition and weight to that used in Example 2. The ignition source was the Boston Bag test. Flaming was not as severe as in Example 3 and considerably diminished in 3.25 minutes and self-extinguished in 4.25 minutes. About 60% of the face of the back cushion and 50% of the face of the seat cushion was charred. The glass fiber fabric remained intact and neither the front nor rear seats were damaged. Maximum ceiling temperature was 254° F.

It is evident that while the sequentially applied fabrics of Example 3 function as a self-extinugishing fire barrier, the laminated fabric of Example 4 was superior.

EXAMPLE 5—California Ignition Source

Bus seats identical to those in Example 4 were used. The more stringent California 113 ignition source was used. The California source consists of a small "stove" with 10 inch×10 inch×10 inch dimensions. The top and one side are made of sheet metal, the two adjacent sides are chicken wire and the fourth side and bottom are open. Five sheets of newspaper (90±5 gms) are crumpled and placed within the stove. The open side is placed against the back cushion and the open bottom rests on the seat cushion. The purpose of the "stove" is to confine and focus the ignition energy on the joint between the seat and back cushions. Flames diminished in 2.0 minutes and self-extinguished in 3.25 minutes. Maximum ceiling temperature was 279° F. About 50% of the seat cushion face and back cushion face was charred. Neither the front nor rear seats were damaged.

EXAMPLE 6—Vandalized Bus Seats

In order to determine whether cuts and punctures in the fabric would significantly reduce the fire barrier properties, three bus seats of the Example 4 construction were placed in the test chamber. Three punctures were made in the back cushion as well as a 5 inch long slash located about 3 inches above the intersection of the seat and back cushions. A 9 inch slash was made in the center of the seat cushion at a diagonal angle. The fabric edges at the slashes curled back exposing the underlying urethane foam. The Boston Bag ignition source was used. The paper bag was located at the top of the slash. Two minutes after ignition, the paper was still burning although smoke generation had diminished. At 3.0 minutes, flames had diminished; at 3.75 minutes the back cushion had self-extinguished but there were still 3 to 4 inch high flames on the seat cushion probably at the slash. There were occasional flashes of flame on the seat cushion probably due to ignition of gaseous pyrolysis products from urethane decomposition at the vicinity of the slash. The fire self-extinguished at 5.50 minutes. Thus, even where the fabric has been damaged leading to exposure of the urethane foam, the fire barrier functions.

EXAMPLE 7—School Bus Burns

A full scale fire test of school bus seating was performed and produced actual conditions of air flow, heat, smoke and flames that may occur in a school bus fire. Five types of seat coverings were tested, each being a form of vinyl upholstery covering the standard polyurethane seat pad/cushion. The first material was the standard vinyl/scrim laminate fabric presently used in school buses and meeting all applicable federal and state standards. The other four were various barrier fabrics. These tests were carried out by a major manufacturer of school buses and the composition of the fabrics, other than the vinyl/glass fabric of this invention, were proprietary. The other fabrics were identified as Vonar (Chris Craft), Polyvoltac (Polyvoltac Corp.) and Neoprene (Dupont Corp.). The vinyl/glass fiber fabric performed extremely well, self-extinguishing in 6 minutes and 15 seconds without permitting flame penetration into the polyurethane seat material. Each of the other three proprietary fabric seat coverings performed better than current standard fabric by delaying the flame penetration into the polyurethane. However, each of the other proprietary seat covering materials: Vonar, Polyvoltac and Neoprene did experience a flare up of flames after penetration into the polyurethane took place.

Test A

The bus was a 1967 standard conventional bus body with seats constructed of standard metal seat frames with plywood back, standard rebonded polyurethane seat pad/cushion and standard vinyl cover. There were ten rows of seats spaced at 27.5 inches. The fire resistance test procedure for seats utilizes as an ignition source six sheets of standard size newspaper loosely crumpled and placed in a standard paper grocery bag. The total weight of ignition source was about 7.3 ounces. The bag was placed with the open top of the bag at the centerline of the seat with the narrow side down on the cushion and the wider side against the back pad and the bottom of the bag toward the wall mount side of the seat. Thermocouples were placed in the walkway adjacent to the seat being ignited. The thermocouples were located one inch below the ceiling, 36 inches above the floor and one inch above the floor. The rear door, front door and first right side window were open. The ignition source was lighted with a match. One minute, 53 seconds after ignition, flames were lapping over the top of the seat and the bus was filled with black smoke. At 2 minutes and 15 seconds flash-over occurred to the next forward seat back and at 3 minutes and 35 seconds flash-over occurred to the next rearward seat. A maximum temperature of over 1432° F. was reached within 3 minutes and 45 seconds. Within 7 minutes the bus was completely engulfed in flames and at 7 minutes and 23 seconds the fire was extinguished by the local fire department.

Test B

All conditions in the test were identical to Test A except that the fabric consisted of the glass fiber fabric of Example 1 laminated to vinyl fabric by extrusion casting the vinyl onto the glass fiber fabric. Six minutes and 15 seconds after ignition, the fabric self-extinguished. The vinyl/glass upholstery prevented penetration of flames into the pad material. There was no damage to adjacent seats. The maximum temperature was 248° F., 2 minutes and 15 seconds after ignition.

Test C

All conditions in this test were identical to Test A except that the fabric was Vonar (Chris-Craft Corp.). Flames became well established on the seat pad vinyl and consumed half of the surface area. The flames diminished until about 5 minutes and 40 seconds after ignition when the flames penetrated through the Vonar material and ignited the polyurethane and plywood backing. The fire continued to increase in strength and was extinguished by the fire department 7 minutes and 43 seconds after ignition.

Test D

All conditions in this test were identical to Test A except that the fabric consisted of vinyl with an underlying layer of Polyvoltac (Polyvoltac Corp.). Flames became well established on the seat pad vinyl and consumed half of the surface area. The flames diminished until at 4 minutes and 5 seconds after ignition. At that time flames penetrated the Polyvoltac layer and ignited the polyurethane. After 6 minutes and 28 seconds, the fire had to be extinguished by the fire department.

Test E

All conditions in this test were identical to Test A except that between the vinyl face fabric and the polyurethane foam was a ½ inch layer of Neoprene (Dupont) foam. Flames became well established on the seat pad vinyl and consumed half of the surface area. The flames penetrated the Neoprene layer. However, the fire self-extinguished after 6 minutes and 40 seconds.

EXAMPLE 8

A heat cleaned plain weave glass fiber fabric having a count of 60 warp ends per inch and 60 fill ends per inch was given a primer finish by immersing the fabric in an aqueous bath consisting of 0.3% of gamma glycidoxypropyltrimethoxy-silane, 4.0% of a 46% solids polyacrylic ester copolymer emulsion. The fabric was squeezed through pad rolls and dried. The dry add-on was about 1.25% based on the weight of the fabric. An encapsulating coating similar to that described in Example 1 was used except that the ethyl acrylate/acrylonitrile copolymer latex was replaced by a thermoplastic aromatic polyurethane latex. The coating was applied to the primed glass fiber fabric using a floating knife coater. After drying, the add-on was 14%. The same encapsulating coating was applied to a greige plain weave glass fiber fabric weighing 3.2 oz. per square yard. Both fabrics were laminated to a 30 oz. per square yard vinyl film which had been given a leather-like emboss on the face side. The laminates were prepared by heating a sandwich of the glass fabric and vinyl film in a press heated to 350° F. for about 6 minutes. Cushions having dimensions of 24×36×4 inches were prepared by wrapping the vinyl/glass fabric around a slab of standard polyurethane foam of comparable dimensions. Two cushions were arranged in an "L" configuration to simulate seat and back of a chair or bench. A grocery sack containing 155 grams of crumpled newspaper was placed in the center of the seat at the intersection of the vertical and horizontal cushions. The sack was ignited. The vinyl melted and charred in the vicinity of the paper sack but self-extinguished when the paper fuel supply was exhausted. About 75% of the seat cushion and about 60% of the seat cushion were charred but the glass fabric was intact. The fabric was removed and the urethane foam examined. About 40% of the face of the urethane foam in the seat cushion was charred and in the area where the paper sack was burned, the urethane had melted away to a depth of about one inch. There was little difference in flame barrier properties between the two fabrics.

EXAMPLE 9

A heat cleaned crowfoot weave glass fiber fabric having a yarn count of 60×60 (warp×fill) and a weight of 3.2 oz per square yard was given an encapsulating coating. The coating consisted of a low molecular weight polyvinyl chloride resin dispersed in tris(2-ethylhexyl/phosphate). The plastisol was coated on the fabric and fused at 350° F. for 90 seconds. The dry add-on was 120% based on the weight of the fabric. A 28 ounces per square yard blue plasticized vinyl fabric normally used for bus seat upholstery was heat laminated to the plastisol coated glass fabric at 400° F. for 6.5 minutes. The peel strength of the vinyl to glass fabric bond was 9.7 pounds per inch width. The fire barrier properties of the vinyl/glass fabric were comparable to those of the fabric described in Example 8.

EXAMPLE 10

A greige plain weave glass fiber fabric having a yarn count of 60×48 ends per inch (warp×fill) was heat cleaned. The resulting fabric weighed 3.16 ounces per square yard. The fabric was given a primer coating as described in Example 8. The fabric was then given an encapsulating coating of a solvent based heat activatable polyurethane (Royal S-5213, a product of Uniroyal Inc.). The dry add-on of coating was 16% based on the weight of fabric. Flame barrier properties were satisfactory.

EXAMPLE 11

A vinyl/glass fiber fabric similar to that of Example 10 was prepared except that the laminating adhesive consisted of the following:

100 parts aromatic thermoplastic urethane latex
3.5 parts polyacrylic acid latex
0.2 parts defoamer
1.6 parts water The pH was raised to 9.5–9.8 with aqua ammonia. The resultant coating had a viscosity of 100,000 cps. The dry deposit of coating on the glass fabric was 0.5 ounces per square yard. The laminate was prepared by extruding a hot (380° F.) plasticized vinyl coating onto the coated glass fabric and passing the sandwich through hot nip rolls. The weight of the laminate was 22 ounces per square yard. The glass to vinyl bond strength of the laminate exceeded the tear strength of either component. The fabric was an effective fire barrier for upholstered kitchen stools and bus seats.

EXAMPLE 12

A vinyl/glass fabric was prepared in a manner identical to that of Example 11 except that the polyurethane latex was a 50/50 blend of a thermoplastic aromatic polyurethane and a thermoplastic aliphatic polyurethane. The strength of the glass to vinyl bond exceeded the tear strength of either component.

EXAMPLE 13

A polyurethane/glass fiber fabric was prepared by heat laminating an 8 ounce per square yard cast polyurethane film (Estane, a product of B. F. Goodrich Co.) to the urethane coated glass fabric of Example 11. The bond strength was greater than 10 pounds per inch of width. The laminated upholstery fabric was needle punched to produce an air permeable fabric. The permeability was 150 cubic feet of air per square foot of fabric per minute at a water pressure of one-half inch. The fabric was used to prepare a cushion by covering a 16×16×3 inch foam polyurethane slab with the fire barrier fabric. The fabric prevented penetration of flames to the foam polyurethane when the ignition source was the Boston bag test.

While the fabrics described in the preceding examples are especially suitable as upholstery fabrics, they can also have application as wallcoverings, room dividers, tenting, tarpaulins and protective fabrics for military applications.

It would be apparent to those skilled in the art that polymeric films other than vinyls or urethanes could be used as face fabrics. However, the great majority of polymeric films used as upholstery face fabrics are based on vinyls and urethanes.

What is claimed is:

1. A flame resistant fire barrier fabric comprising a preformed self-extinguishing thermoplastic face fabric laminated to an underlying glass fabric comprising glass fibers coated with a thin adherent encapsulating coating that substantially minimizes fiber to fiber self abrasion, and wherein the porosity of the fire barrier fabric does not exceed about 300 cubic feet per square foot per minute when measured at a pressure of one-half inch of water.

2. The fire barrier fabric of claim 1, wherein the face fabric is plasticized polyvinyl chloride.

3. The fire barrier fabric of claim 1, wherein the face fabric is a polyurethane.

4. The fire barrier fabric of claim 1, wherein the encapsulating coating comprises a polymeric binder selected from the group consisting of: vinyl chloride polymers, ethylene/vinyl chloride copolymers, vinylidine chloride/alkyl methacrylate copolymers, vinyl chloride/vinyl acetate copolymers, polyurethanes, vinyl acetate/alkyl acrylate copolymers, or combinations thereof.

5. The fire barrier fabric of claim 4, wherein the polymeric binder is an ethylene/vinyl chloride copolymer.

6. The fire barrier fabric of claim 1, used as an upholstery fabric.

7. The fire barrier fabric of claim 6, used in transportation vehicles.

8. The fire barrier fabric of claim 6, used in institutional and public buildings.

9. The fire barrier fabric of claim 1, wherein the face fabric and underlying fabric are bonded by adhesive, thermal or stitch bonding process.

10. The fire barrier fabric of claim 1, wherein the bonding is by extrusion casting.

11. The fire barrier fabric of claim 1, wherein the encapsulating coating comprises a primer finish containing a silane coupling agent, acrylic ester copolymer and an encapsulating coating including a halogen containing polymer, antimony oxide and aluminum trihydrate.

12. The fire barrier fabric of claim 1, wherein the glass fiber fabric is woven.

13. The fire barrier fabric of claim 1, wherein the glass fiber fabric is unwoven.

14. The fire barrier fabric of claim 12, wherein the woven glass fibers have warp counts varying from about 40 to 120 and filling counts varying from about 30 to 60.

15. A method for imparting flame resistance to a laminated fire barrier fabric material comprising:
    (a) coating a glass fiber fabric with a thin adherent protective coating to encapsulate the glass fibers and minimize fiber to fiber self abrasion; and
    (b) laminating a preformed thermoplastic face fabric to the coated glass fiber fabric to produce the laminated fire barrier fabric material wherein the porosity does not exceed about 300 cubic feet per square foot per minute when measured at a pressure of one-half inch of water.

16. The method of claim 15, wherein said face fabric is a vinyl material.

17. The method of claim 15, wherein the encapsulating coating comprises a polymeric binder selected from the group consisting of: vinyl chloride polymers, ethlene/vinyl chloride copolymers, vinylidine chloride/alkyl methacrylate copolymers, vinyl chloride/vinyl acetate copolymers, polyurethanes, vinyl acetate/alkyl acrylate copolymers, or combinations thereof.

18. The method of claim 15, wherein the fabric material is used in upholstery.

19. The method of claim 18, wherein the fabric material meets the OEM standards of the Bus Industry.

20. A product formed by the method of claim 15.

* * * * *